(12) United States Patent
Kondo et al.

(10) Patent No.: US 6,231,308 B1
(45) Date of Patent: May 15, 2001

(54) ROTOR BLADE FOR ROTARY WING AIRCRAFT

(75) Inventors: Natsuki Kondo; Tomoka Tsujiuchi; Eiichi Yamakawa, all of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 08/925,526

(22) Filed: Sep. 8, 1997

(30) Foreign Application Priority Data

Mar. 24, 1997 (JP) .................................................. 9-070214

(51) Int. Cl.[7] .................................................. B63H 1/26
(52) U.S. Cl. ........................... 416/228; 416/235; 416/237
(58) Field of Search ........................... 416/223 R, 228 A, 416/228 R, 235, 237

(56) References Cited

U.S. PATENT DOCUMENTS

| | | | |
|---|---|---|---|
| 3,822,105 | * | 7/1974 | Jepson . |
| 4,077,741 | * | 3/1978 | Lowson et al. ....................... 416/228 |
| 4,427,344 | * | 1/1984 | Perry .................................... 416/223 |
| 4,975,022 | * | 12/1990 | Perry .................................... 416/228 |
| 5,174,721 | * | 12/1992 | Brocklehurst .................... 416/223 R |
| 5,199,851 | * | 4/1993 | Perry et al. ...................... 416/223 R |
| 5,205,715 | * | 4/1993 | Perry et al. ........................... 416/228 |
| 5,246,344 | * | 9/1993 | Perry .................................... 416/228 |
| 5,320,494 | * | 6/1994 | Reinfelder et al. ................... 416/226 |

FOREIGN PATENT DOCUMENTS

| | | | | |
|---|---|---|---|---|
| 0 518 598 | * | 12/1992 | (EP) | ............................... B64C/27/46 |
| 1 538 055 | * | 1/1979 | (GB) . | |
| 56-149297 | * | 11/1981 | (JP) | ............................... B64C/27/46 |
| 2-60898 | * | 3/1990 | (JP) | ............................... B64C/27/46 |
| 5-170186 | * | 7/1993 | (JP) | ............................... B64C/27/46 |

* cited by examiner

*Primary Examiner*—F. Daniel Lopez
*Assistant Examiner*—Ninh Nguyen
(74) *Attorney, Agent, or Firm*—Baker Botts L.L.P.

(57) ABSTRACT

The root end is attached to the rotor head for rotationally driving. The central portion has aerodynamic characteristics depending on the leading and trailing edges and which extend linearly from the root end in parallel to each other, and the chord dimension therebetween. A planform shape of the blade tip portion is defined by the first leading edge which extends forwardly as the distance from the outboard end of the leading edge of the central portion outwardly increases, the second leading edge and the side edge which are rearwardly swept as the distance from the outboard end of the first leading edge toward outboard side outwardly increases, the first trailing edge which is curved forwardly as the distance from an outboard end of the trailing edge of the central portion outwardly increases, and the second trailing edge which is swept rearwardly as the distance from the outboard end point of the first trailing edge outwardly increases. This configuration makes it possible to eliminate the delocalization in the supersonic region and greatly reduce high-speed impulsive noises.

3 Claims, 5 Drawing Sheets

RECTANGULAR

SWEPT TAPERED

BERP

AT1

ROTOR BLADE FOR ROTARY WING AIRCRAFT

BACKGROUND OF THE INVENTION

1. Field of the Invention

The present invention relates to a rotor blade for rotary wing aircraft such as a helicopter, and particularly to a rotor blade for rotary wing aircraft having a special blade tip planform shape.

2. Description of the Related Art

FIG. 8 is a view showing rotor aerodynamic environment of a helicopter in forward flight. As shown in FIG. 8A, when a helicopter 1 flying at forward speed V with a rotor having radius R which rotates at angular speed $\Omega$, the relative airspeed varies significantly between an advancing blade where the angular speed $\Omega R$ of the rotor is added to the forward speed V and a retreating blade where the forward speed V is subtracted from the angular speed $\Omega R$ of the rotor.

At a position where azimuth angle $\Psi$ (angle measured counterclockwise from the rearward direction of the helicopter 1) equals to 90°, the airspeed of the advancing blade reaches a maximum and the airspeed of the blade tip becomes $\Omega R+V$. At a position of azimuth angle $\Psi=270°$, on the other hand, the airspeed of the retreating blade reaches a minimum and the airspeed of the blade tip becomes $\Omega R-V$. The airspeed of an intermediate portion of the blade takes a value obtained by proportional distribution of $\Omega R+V$ and $\Omega R-V$. For example, when $\Omega R=795$ km/h and $V=278$ km/h are assumed, the airspeed at a position of about 35% from the root end of the retreating blade becomes zero, as shown in FIG. 8A.

When a helicopter flies at high speed, in particular, the airspeed at a tip of an advancing blade reaches a transonic speed resulting in a strong shock wave. A noise generated by the strong shock wave is called high-speed impulsive noise. A phenomenon called delocalization in an ultrasonic region takes place at this time in a coordinate system viewed from the rotor blade which is in rotational motion. The shock wave generated is transmitted through the delocalized ultrasonic region over a great distance, making a high noise to be heard at a distance.

Since the airspeed of a retreating blade is significantly lowered, the angle of attack a of the blade must be greater in order to produce a lift similar to that of the advancing blade, and it is common to use a cyclic pitch control wherein the pitch angle of the blade is controlled in accordance to the azimuth angle $\Psi$. While the pitch angle of the blade is controlled by means of sine wave of which amplitude is minimum at azimuth angle $\Psi=90°$ and maximum at azimuth angle $\Psi=270°$, the angle of attack $\alpha$ of the blade in this case varies in the direction of span as shown in FIG. 8B due to flapping of the blade itself. For example, when $\Psi=90°$, the angle of attack $\alpha$ of the blade becomes about 0° at the root end and about 4° at the tip end. When $\Psi=270°$, the angle of attack $\alpha$ of the blade becomes about 0° at the root end and about 16 to 18° at the tip end, thus exceeding the stalling angle. When the angle of attack $\alpha$ of the blade exceeds the stalling angle, lift coefficient Cl and pitching moment coefficient Cm change rapidly, causing to violent vibration of the helicopter structure and a high fatigue load being applied to the pitch link.

Design items used for evaluating the characteristics of an advancing blade include high-speed impulsive noise and those for evaluating a retreating blade include maximum lift coefficient Clmax and stalling angle. The maximum lift coefficient Clmax is defined as the maximum value of lift coefficient when the angle of attack $\alpha$ of a blade having a particular aerofoil section is just before the stalling angle. A blade is considered to be better blade when the high-speed impulsive noise and the absolute value of pitching moment coefficient Cm are smaller, and the values of the maximum lift coefficient Clmax and stalling angle are greater. Applying the blade tip portion with a sweptback angle is an example of reducing high-speed impulsive noises. The blade tip with the sweptback angle mitigates the shock wave and somewhat decreases the noises, though the delocalized supersonic region itself remains and the noise is still at a significant level. Moreover, in the case a large sweptback angle is given to the blade tip, blade tip stalling occurs at a smaller angle of attack, resulting in rapid change in the pitching moment coefficient Cm and a decrease in the maximum lift coefficient Clmax.

SUMMARY OF THE INVENTION

An objective of the invention is to provide a rotor blade for rotary wing aircraft capable of eliminating delocalization in a supersonic region and reducing high-speed impulsive noises.

Another objective of the invention is to provide a rotor blade for rotary wing aircraft capable of increasing a stalling angle to provide a good flight performance.

The invention provides a rotor blade for rotary wing aircraft comprising:

a root end portion attached to a rotor head for rotationally driving, a central portion having aerodynamic characteristics depending on leading and trailing edges linearly extending in parallel from the root end and a chord dimension therebetween, and a blade tip portion having a planform shape defined by a first leading edge extending forwardly as a distance from an outboard end of the leading edge of the central portion outwardly increases, a second leading edge which is swept rearwardly as the distance from the outboard end of the first leading edge outwardly increases, a side edge and a trailing edge, wherein distance R1 from the center of rotation of the rotor to outboard end point P of the first leading edge normalized by the blade length satisfies the following conditional relationship (1):

$$0.88 \leq R1 \leq 0.92 \tag{1}$$

According to the invention, delocalization in the supersonic region can be eliminated and the high-speed impulsive noises can be greatly reduced. With a rectangular blade or a tapered blade of the prior art, a region where the speed of the air exceeds the speed of sound is generated at the forward area of the blade tip portion viewed from a rotating blade coordinate system, and moreover a steep air speed gradient in the supersonic region likely to cause large shock waves and the supersonic region tends to extend further and delocalized, with a result of high noises being easily transmitted over a great distance. According to the invention, in contrast, such an extension of the leading edge is provided as an apex of the extension or outboard end point P is located at 0.88 to 0.92 so that shock wave occurring at this position is mitigated and delocalization is eliminated, and therefore the high-speed impulsive noises can be reduced.

The invention also provides a rotor blade for rotary wing aircraft comprising:

a root end portion attached to a rotor head for rotationally driving, a central portion having aerodynamic characteristics depending on leading and trailing edges linearly extending in parallel from the root end and a chord dimension therebetween, and a blade tip portion having a planform shape defined by a first leading edge extending forwardly as a distance from an outboard end of the leading edge of the central portion outwardly increases, a second leading edge which is swept rearwardly as the distance from the outboard end of the first leading edge outwardly increases, a side edge and a trailing edge, wherein the trailing edge comprises a first trailing edge extending forwardly as a distance from the outboard end of the trailing edge of the central portion outwardly increases and a second trailing edge which is swept rearwardly increasingly as the distance from the outboard end of the first trailing edge outwardly increases.

According to the invention, providing the forward extension on the leading edge of the blade tip portion increases the stalling angle and the maximum lift coefficient Clmax, and making a forward extension in the trailing edge in correspondence to the forward extension on the leading edge makes it possible to have chord dimension of the blade tip portion nearly equal to the chord dimension of the central portion, thus preventing the blade performance from deteriorating due to smaller thickness to chord ratio in the portion provided with the forward extension. This configuration greatly improves the flight performance.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
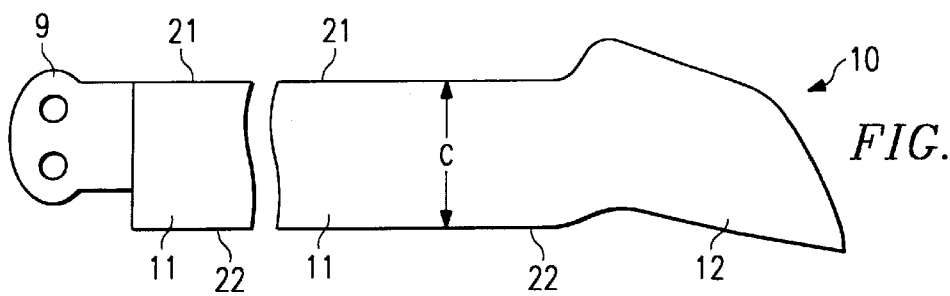
FIG. 1 is a plan view showing an embodiment of the invention.

Now referring to the drawings, preferred embodiments of the invention are described below.

FIG. 1 is a plan view showing an embodiment of the invention. A rotor blade 10 is like a main wing which supports the weight of a helicopter by rotating, and has a root end 9, a central portion 11 and a tip portion 12. The root end 9 is a member for attachment to a rotor head which drives the rotor blade 10 to rotate. The central portion 11 is formed to extend linearly from the root end, and has a leading edge 21 and a trailing edge 22 which are parallel to each other. A chord dimension C of the central portion 11 is defined by the distance between the leading edge 21 and the trailing edge 22. The central portion 11 has aerodynamic characteristics which are related to the leading edge 21, the trailing edge 22, chord dimension C.

With regard to the planform shape of the blade, an outline thereof will be described first by referring to FIG. 2, then the length of each portion and other properties will be described, followed by definition of the configuration by means of an equation.

Figure 2:
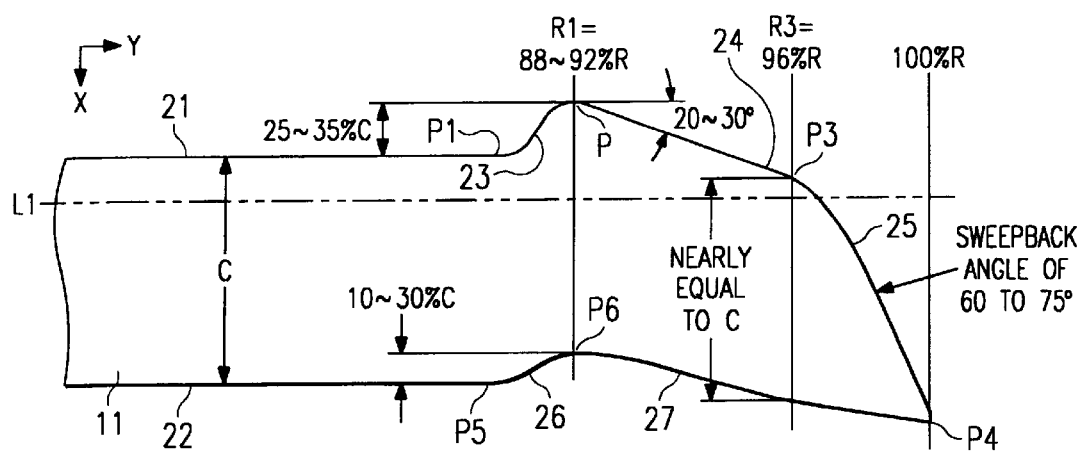
FIG. 2 is a partially enlarged view of a rotor blade 10 of FIG. 1.

FIG. 2 is a partially enlarged drawing of the rotor blade 10 of FIG. 1. A tip portion 12 is formed on an end of the central portion 11 opposite to the root end 9, with a planform shape being defined by a first leading edge 23, a second leading edge 24, a side edge 25, a first trailing edge 26 and a second trailing edge 27. The first leading edge 23 extends forwardly as the distance from an outboard end P1 of the leading edge 21 of the central portion end 11 outwardly increases, and extends to an outboard end P of the first leading edge 23. Outboard side here refers to the side of blade tip in Y direction (span direction) of the rotor blade 10, and outboard end of the leading edge means the end point on the side of a blade end in the span direction of the rotor blade 10 .

The second leading edge 24 is swept rearwardly as the distance from the outboard end P of the first leading edge 23 toward outboard side increases outwardly, and extends to the outboard end point P3 of the second leading edge 24. The side edge 25 is swept rearwardly as the distance from the outboard end P3 of the second leading edge 24 toward outboard side increases outwardly, and extends to the trailing end point P4 of the side edge 25. The first trailing edge 26 is curved forwardly as the distance from an outboard end P5 of the trailing edge 22 of the central portion end 11 increases outwardly, and extends to an outboard end P6 of the first trailing edge 26. The second trailing edge 27 is swept rearwardly increasingly toward outboard side to the trailing end point P4 of the side edge 25.

In FIG. 2 are given dimensions of portions of the rotor blade 10, normalized on the basis of the blade length R in Y direction and on the basis of the chord dimension C in X direction to facilitate embodying the invention as various sizes of helicopters.

A position of the extension on the leading edge or distance R1 in Y direction from the center of rotation to the outboard end P is set to satisfy the following conditional relationship in order to mitigate shock waves:

$$88\%R \leq R1 \leq 92\%R \quad (1).$$

An amount of forward extension of the leading edge, namely distance of the outboard end P from the leading edge 21, is set to 25 to 35%C in order to suppress the generation of shock waves and prevent the nose-up pitching moment from increasing. Also in order to have a thickness to chord ratio as nearly the same that of the central portion end 11 as possible, the notch in the trailing edge is located at a position corresponding to the forward extension of the leading edge, namely a distance from the outboard end P6 of the first trailing edge 26 is set equal to distance R1, and the outboard end P6 is located at a distance of 10 to 30%C from the trailing edge 22. In order to cancel out the nose-up pitching moment caused by the forward extension of the leading edge, distance R3 from the center of rotation to the outboard end P3 in Y direction is set to 96%R, a chord dimension passing through the outboard end P3 is set to approximately C, and a rearwardly sweeping angle of the second leading edge 24 is set to 20° to 30°. Moreover, in order to suppress the delocalization in the supersonic region, the side edge 25 is swept rearwardly at a steep angle of 60° to 75° from the outboard P3 thereby tapering down the chord length toward the tip.

The outline which defines the planform shape described above includes curved sections smoothly joining with each other. In an XY plane, for example, the planform shape of the rotor blade 10 includes curved sections defined by equations (2) through (11), where an origin of the XY coordinate system being at the center of rotation of the rotor, and a Y axis corresponding to the feathering axis L1. An X axis is set such that positive values of X coordinates direct to the rearward side of the blade, and Y axis is set such that Y coordinates positively increase to the blade tip side. The feathering axis refers to the axis around which the blade rotates as the angle of attack of the blade is changed.

$$0 \leq Y < A1, Xf = B1 \tag{2}$$

$$A1 \leq Y < A2, Xf = \sqrt{B2^2 - (Y - A1)^2} + B2 + B1 \tag{3}$$

$$A2 \leq Y < A3, Xf = \tan(-60)(Y - A2) + B3 + B1 \tag{4}$$

$$A3 \leq Y < A4, Xf = \sqrt{B2^2 - (Y - A7)^2} + B4 + B1 \tag{5}$$

$$A4 \leq Y < A5, Xf = \tan(20)(Y - A4) + B5 + B1 \tag{6}$$

$$A5 \leq Y \leq A6, Xf = B6Y^2 + B7Y + B8 + B1 \tag{7}$$

$$0 \leq Y < A1, Xr = C1 + B1 \tag{8}$$

$$A1 \leq Y < A7, Xr = C2Y^3 + C3Y^2 + C4Y + C5 + C1 \tag{9}$$

$$A7 \leq Y < A5, Xr = C6Y^3 + C7Y^2 + C8Y + C9 + B1 \tag{10}$$

$$A5 \leq Y \leq A6, Xr = \tan(10)(Y - A5) + C10 + B1 \tag{11}$$

where $X_f$ represents the X-coordinate for a given y value of the forward portion of the rotor blade and where $X_r$ represents the X-coordinate for a given y value of the rear portion of the rotor blade.

The leading edge 21 is defined by a straight line represented by equation (2). The first leading edge 23 is defined by equation (3), equation (4) and part of equation (5), which represent a part of circle, a straight line and a part of circle in order from the center of rotation of the rotor, respectively. The second leading edge 24 is defined by a part of equation (5) and equation (6), which represent a part of circle and straight line, respectively. The side edge 25 is defined by a parabola represented by equation (7). The trailing edge 22 is defined by a straight line of equation (8). The first trailing edge 26 is defined by a cubical curve represented by equation (9). The second trailing edge 27 is defined by a cubical curve represented by equation (10) and a straight line represented by equation (11).

When the ratio of a blade length R to the chord dimension C is set to a constant value R/C=18.06685, for example, the constants become A1=0.895540185, A2=0.9030299516, A3=0.9060258583, A4=0.9164735648, A5=0.96540625, A6=1, A7=0.913515625, B1=0.0138335, B2=−0.0086484375, B3=−0.0043242188, B4=−0.0051890625, B5=−0.0133159354, B6=37.9362379432, B7=−72.8837907, B8=35.0100387877, C1=0.05535, C2=2382.4239404288, C3=−6464.9068069736, C4=5847.1112560, C5=−1762.5583891568, C6=−97.8796005419, C7=277.5612092703, C8=−262.0682683, C9=82.4414516986, and C10=0.0598441055.

When the constants are set as shown above, the position of each portion is represented by coordinates which assume R=1. When applying the configuration to particular aircraft, actual dimensions can be obtained by multiplying the above dimensions by the actual value of R.

Thus because the leading edge at the blade tip portion 12 extends forwardly with an apex located at a position of Y=91.3515625%R, delocalization in the supersonic region is eliminated and high-speed impulsive noises can be reduced. Furthermore, since the trailing edge of the blade tip portion 12 is recessed with the bottom of the recess located at a position of Y=91.3515625%R, rapid change in the pitching moment coefficient Cm can be suppressed while increasing the stalling angle and the maximum lift coefficient Clmax.

Even when the configuration is defined as described above, coordinates Xf, Xr and Y may include errors of about +3% introduced during the manufacturing process, and also the coordinates Xf, Xr and Y may be subject to errors of about +3% due to thermal deformation and other causes after manufacturing.

Now referring to FIGS. 3A through 3D and FIGS. 4A through 4C, the delocalization in the supersonic region will be described below.

Figure 3A:
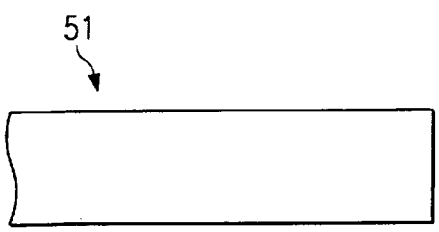
FIGS. 3A through 3D are plan views showing configurations of the rotor blade 10 and a comparative example.
Figure 3B:
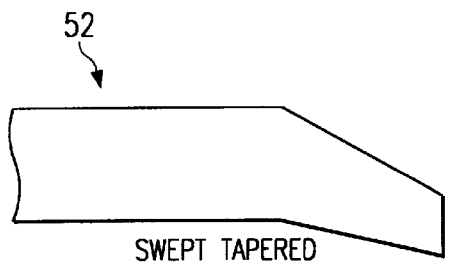
Figure 3C:
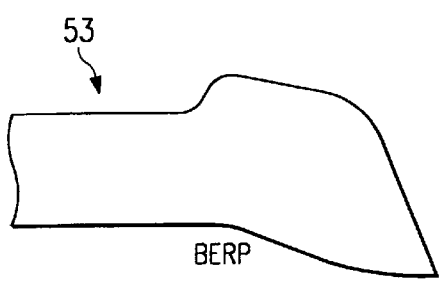
Figure 3D:
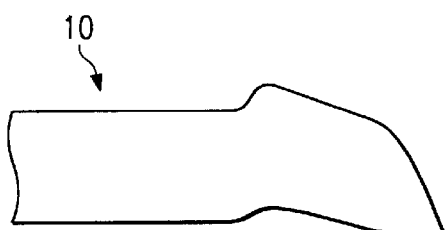
Figure 4A:
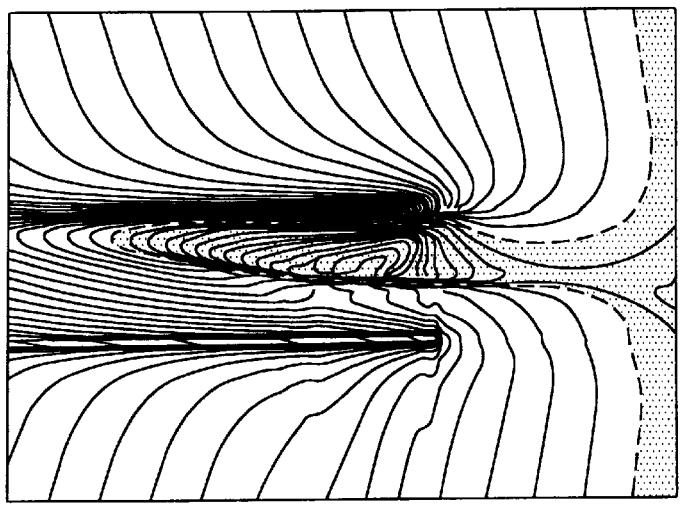
FIGS. 4A through 4C are equi-Mach number diagrams obtained through CFD analysis.
Figure 4B:
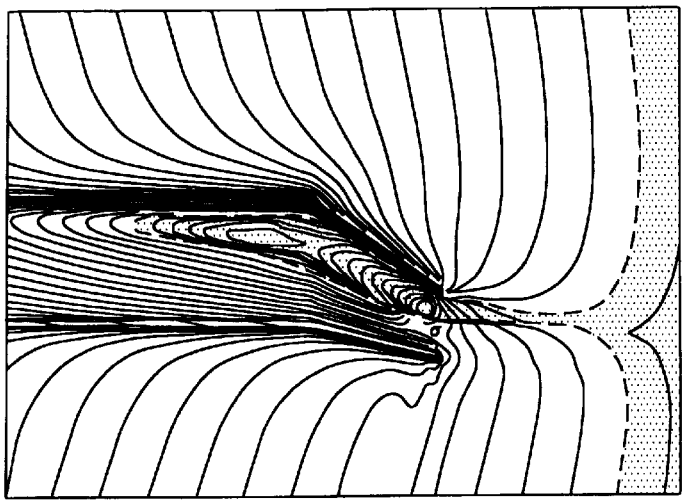
Figure 4C:
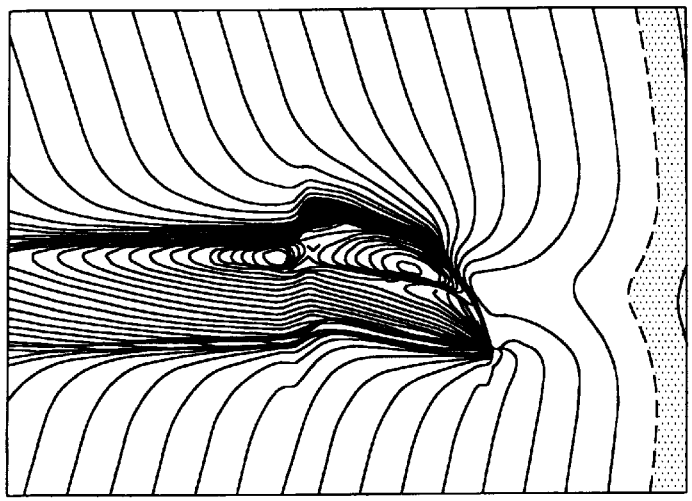
Figure 5A:
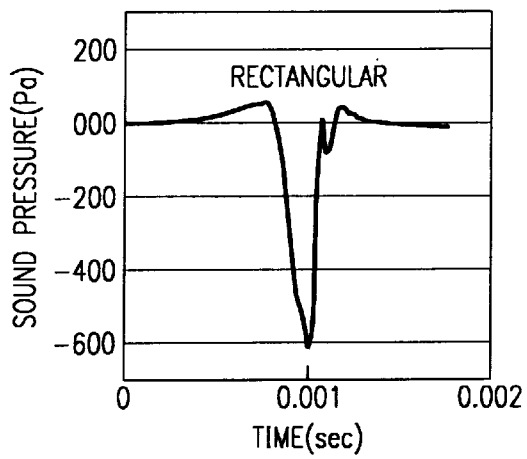
FIGS. 5A through 5D are graphs showing variations of sound pressure in a far field on a blade tip portion of each blade, based on sound analysis.
Figure 5B:
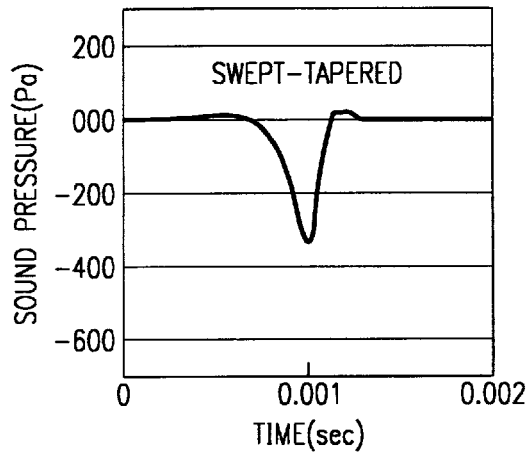
Figure 5C:
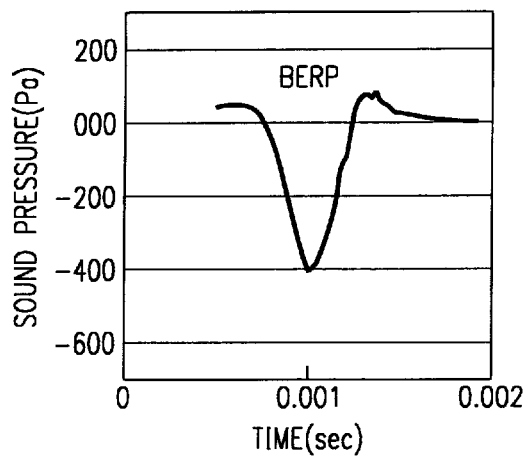
Figure 5D:
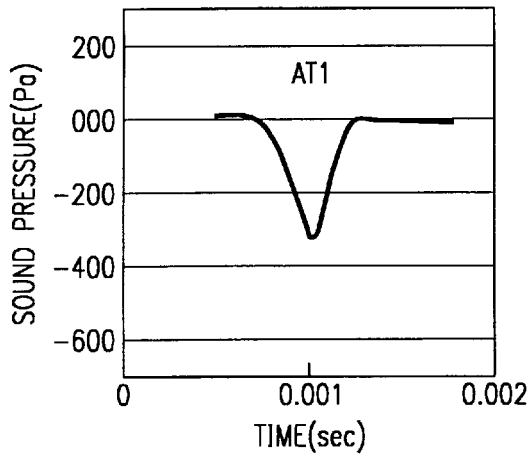

FIGS. 3A through 3D are plan views showing the configurations of the rotor blade 10 and a rotor blade of an comparative example, and FIGS. 4A through 4C are equi-Mach number diagrams obtained through CFD analysis.

The rotor blade 51 shown in FIG. 3A has a rectangular shape. The rotor blade 52 shown in FIG. 3B has a leading edge of the tip portion swept rearwardly by a sweptback angle of 30°, while being tapered at a rate of 0.5. The rotor blade 53 shown in FIG. 3C is a configuration described in U.S. Pat. No. 4,077,741, with the leading edge of the tip portion extending forwardly and being smoothly swept rearwardly toward the tip end. FIG. 3D shows the rotor blade 10, the same as that of FIGS. 1 and 2. In drawings that follow, the rotor blade 10 will be designated to as AT1.

A dashed line in FIG. 4 indicates the position where Mach number is 1, while the region enclosed by the dashed line is a supersonic region wherein Mach number is not less than 1. With the rotor blade 51, as can be seen from FIG. 4A, the region located forward of the blade tip portion continually extends far away from the blade on the tip side. This is generally referred to as delocalization. With the rotor blade 52, as can be seen from FIG. 4B, Mach number is less than that of the rotor blade 51, but the region located forward of the blade tip portion still continually extends far away, with the supersonic region being delocalized. With the rotor blade 10, as can be seen from FIG. 4C, the region located forward of the blade tip portion is separated from the far field and the supersonic region is not delocalized.

FIGS. 5A through 5D are graphs showing results of analyzing variations of sound pressure in a far field away from each rotor blade (3R from the center of rotation). Times (in seconds) are plotted along the axis of abscissa and sound pressures are plotted along the axis of ordinate. The rotor blade 10 causes a less variation of sound pressure in the far field than the rotor blades 51 through 53. This shows that the pressure variation originating from a shock wave generated on the blade is less likely to be transmitted over a distance in the case of the rotor blade 10.

Figure 6:
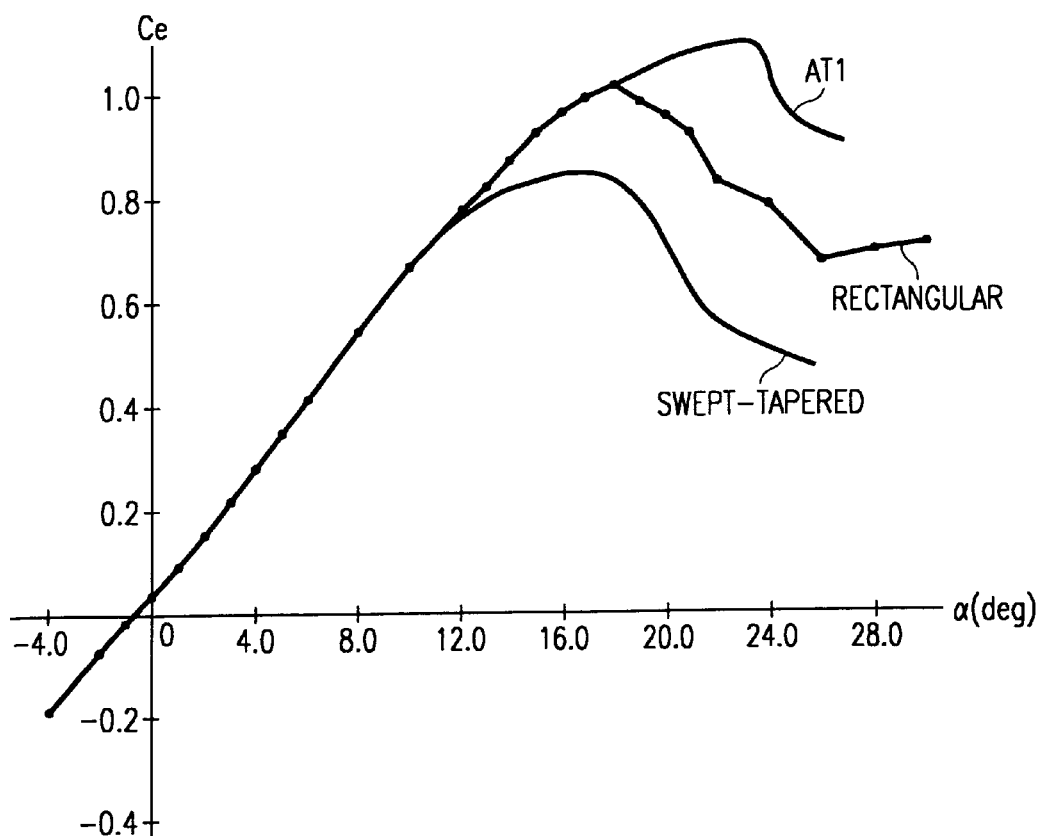
FIG. 6 is a graph showing angle of attack dependency of lift coefficient Cl of each blade.
Figure 7:
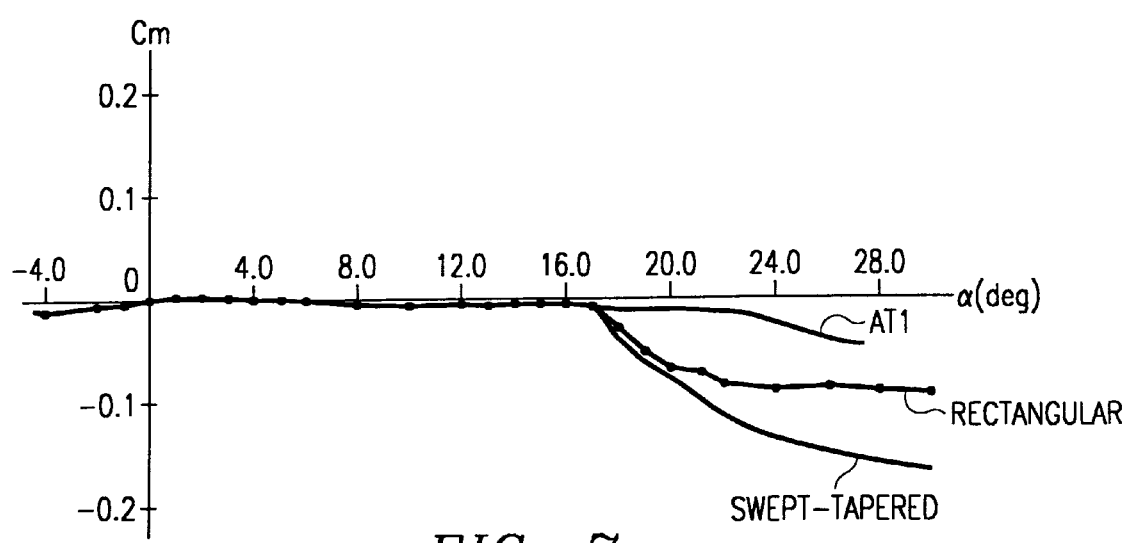
FIG. 7 is a graph showing angle of attack dependency of pitching moment coefficient Cm of each blade.
Figure 8A:
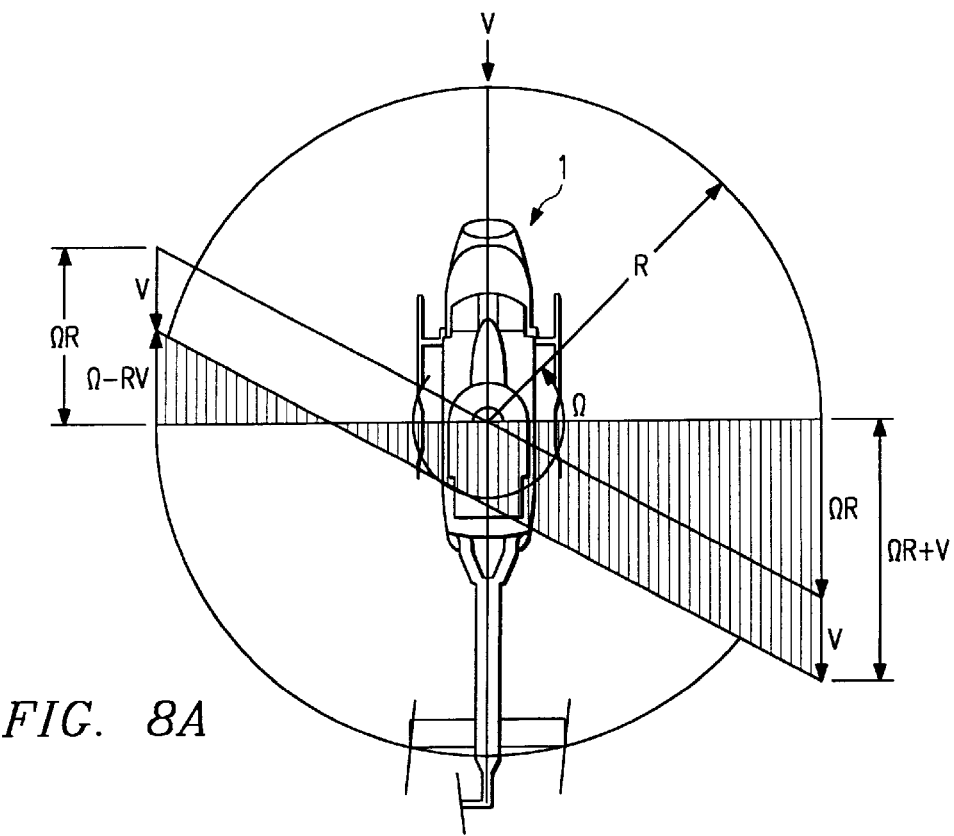
FIGS. 8A and 8B show aerodynamic environment of a helicopter rotor in forward flight.
Figure 8B:
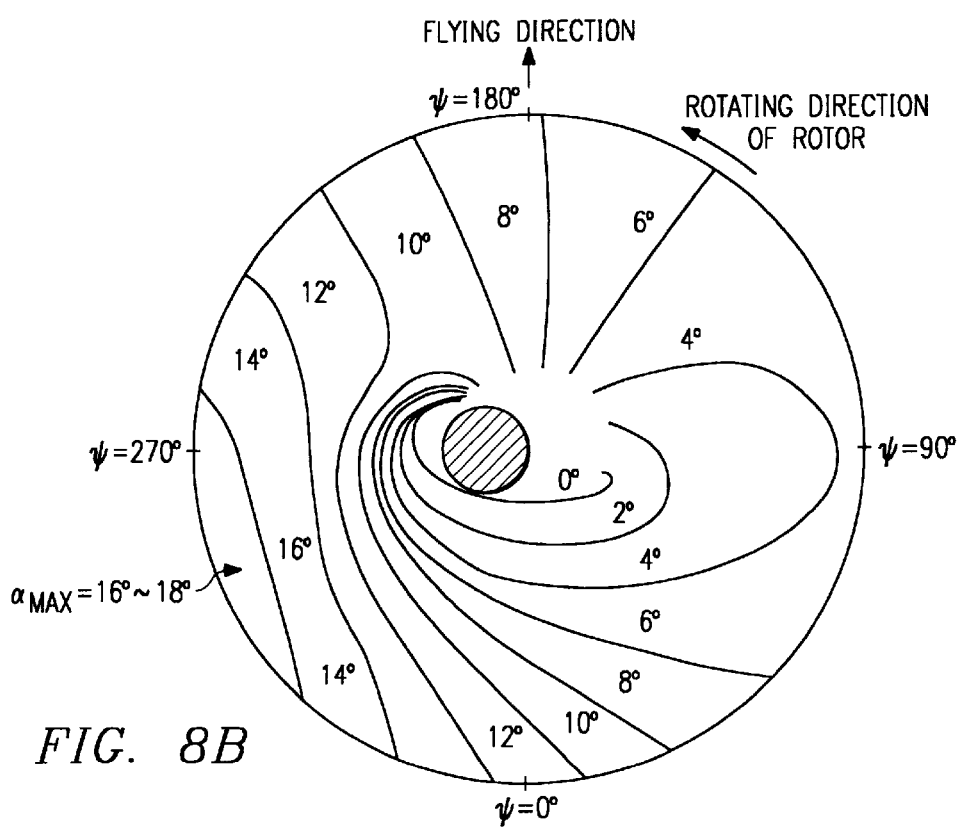

FIG. 6 is a graph showing angle of attack dependency of lift coefficient. FIG. 7 is a graph showing angle of attack dependency of pitching moment coefficient. Angle of attack are plotted along the axis of abscissa (in degrees) and the values of the coefficients are plotted along the axis of ordinate. With the rotor blade 10, the stalling angle and maximum lift coefficient Clmax are increased and rapid change in the pitching moment coefficient Cm is suppressed, as compared with the cases of the rotor blades 51, 52.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rotor blade for rotary wing aircraft having a rotor head, the rotor blade comprising:

a root end portion for attachment to the rotor head;

a central portion having aerodynamic characteristics depending on leading and trailing edges linearly extending in parallel from the root end and a chord dimension therebetween; and a blade tip portion having a planform shape defined by a first leading edge extending forwardly as a distance from an outboard end of the leading edge of the central portion outwardly increases, a second leading edge which is swept rearwardly as a distance from the outboard end of the first leading edge outwardly increases, a side edge and trailing edges;

wherein the trailing edges of the blade tip portion include a first trailing edge extending forwardly as a distance from the outboard end of the trailing edge of the central portion outwardly increases, and a second trailing edge swept rearwardly as a distance from an outboard end of the first trailing edge outwardly increases, and distance R1 from the center of rotation of the rotor to outboard end point of the first leading edge normalized by the blade length satisfies the conditional relationship:

$$0.88 \leq R1 \leq 0.92.$$

2. The rotor blade for rotary wing aircraft of claim 1, wherein:

the outboard end is located at a distance of 0.25C to 0.35C forwardly from the leading edge of the central portion, where C is the chord dimension;

the outboard end of the first trailing edge is located at a distance of 0.1C to 0.3C forwardly from the trailing edge of the central portion;

a sweptback angle of the second leading edge ranges from 20 degrees to 30 degrees; and a sweptback angle of the side edge ranges from 60 degrees to 75 degrees.

3. A rotor blade for rotary wing aircraft having a rotor head, the rotor blade comprising:

a root end portion for attachment to the rotor head;

a central portion having aerodynamic characteristics depending on leading and trailing edges linearly extending in parallel from the root end and a chord dimension there between, and a blade tip portion having a planform shape defined by a first leading edge extending forwardly as a distance from an outboard end of the leading edge of the central portion outwardly increases, a second leading edge which is swept rearwardly as the distance from the outboard end of the first leading edge outwardly increases, a side edge and trailing edges, wherein the trailing edges comprises a first trailing edge extending forwardly as a distance from the outboard end of the trailing edge of the central portion outwardly increases and a second trailing edge which is swept rearwardly as a distance from an outboard end of the first trailing edge outwardly increases, and when the center of rotation of the rotor blade is defined as an origin, a longitudinal direction of the rotor blade is set to a Y coordinate, a direction perpendicular to the Y coordinate is set to an X coordinate, and A1 to A7, B1 to B8, and C1 to C10 are constant, outlines of the forward side and rearward sides of the blade satisfy the following conditional relationships:

$0 \leq Y < A1,\ Xf = B1$ $A1 \leq Y < A2,\ Xf = \sqrt{(B2^2 - (Y - A1)^2)} + B2 + B1$ $A2 \leq Y < A3,\ Xf = \tan(-60)(Y - A2) + B3 + B1$ $A3 \leq Y < A4,\ Xf = \sqrt{(B2^2 - (Y - A7)^2)} + B4 + B1$ $A4 \leq Y < A5,\ Xf = \tan(20)(Y - A4) + B5 + B1$ $A5 \leq Y \leq A6,\ Xf = B6Y^2 + B7Y + B8 + B1$ $0 \leq Y < A1,\ Xr = C1 + B1$ $A1 \leq Y < A7,\ Xr = C2Y^3 + C3Y^2 + C4Y + C5 + C1$ $A7 \leq Y < A5,\ Xr = C6Y^3 + C7Y^2 + C8Y + C9 + B1$ $A5 \leq Y \leq A6,\ Xr = \tan(10)(Y - A5) + C10 + B1.$

* * * * *